United States Patent [19]

Thomas, Jr.

[11] Patent Number: 5,128,671
[45] Date of Patent: Jul. 7, 1992

[54] CONTROL DEVICE HAVING MULTIPLE DEGREES OF FREEDOM

[75] Inventor: William A. Thomas, Jr., Arlington, Tex.

[73] Assignee: LTV Aerospace and Defense Company, Grand Prairie, Tex.

[21] Appl. No.: 509,464

[22] Filed: Apr. 12, 1990

[51] Int. Cl.$^5$ .................. H01J 17/94; B64C 13/50; G05G 9/00

[52] U.S. Cl. ......................... 341/20; 340/706; 340/709; 74/471 XY; 244/221; 244/228; 244/236; 244/191

[58] Field of Search ............ 341/20, 21; 340/706, 340/709; 73/514, 512 A, 10; 434/35; 74/471 XY; 273/148 B; 244/220, 221, 228, 234, 236, 191, 194, 195; 364/190, 453, 434

[56] References Cited

U.S. PATENT DOCUMENTS

| | | | |
|---|---|---|---|
| 2,695,165 | 11/1954 | Hansen | 264/1 |
| 3,350,956 | 11/1967 | Monge | 74/471 |
| 3,561,280 | 2/1971 | MacPhee et al. | 74/471 |
| 3,729,990 | 5/1973 | Oliver | 73/133 |
| 4,046,005 | 9/1977 | Goroski | 73/133 R |
| 4,216,467 | 8/1980 | Colston | 340/365 L |
| 4,498,348 | 2/1985 | Wesson | 73/862.05 |
| 4,536,746 | 8/1985 | Gobeli | 340/365 A |
| 4,555,960 | 12/1985 | King | 74/471 XY |
| 4,566,328 | 1/1986 | Bernard et al. | 73/517 B |
| 4,601,206 | 7/1986 | Watson | 73/517 A |
| 4,641,123 | 2/1987 | Whitehead | 338/128 |
| 4,685,678 | 8/1987 | Frederiksen | 273/148 B |
| 4,688,443 | 8/1987 | Fabre et al. | 74/469 |
| 4,787,051 | 11/1988 | Olson | 340/710 |
| 4,988,981 | 1/1997 | Zimmerman et al. | 340/709 |

OTHER PUBLICATIONS

Winiarski, "Dimension 6 Puts True 3-D Into User's Hands", Computer Graphics Today, Sep. 1988, p. 3.

*Primary Examiner*—Donald J. Yusko
*Assistant Examiner*—Michael Horabik
*Attorney, Agent, or Firm*—Arnold, White & Durkee

[57] ABSTRACT

A hand-held joystick has spaced-apart groups of accelerometers and is free to move or rotate on multiple axes. Each group has, for example, three mutually perpendicular accelerometers, with each one producing an electrical signal responsive to linear acceleration along one axis. The signals are combined to derive a definition of acceleration of the joystick along the three mutually perpendicular linear axes and/or rotation about these axes. The combined signal is used by an electrical control system which provides input to a device being controlled. The signal to the device under control is responsive to the motion of the joystick.

20 Claims, 2 Drawing Sheets

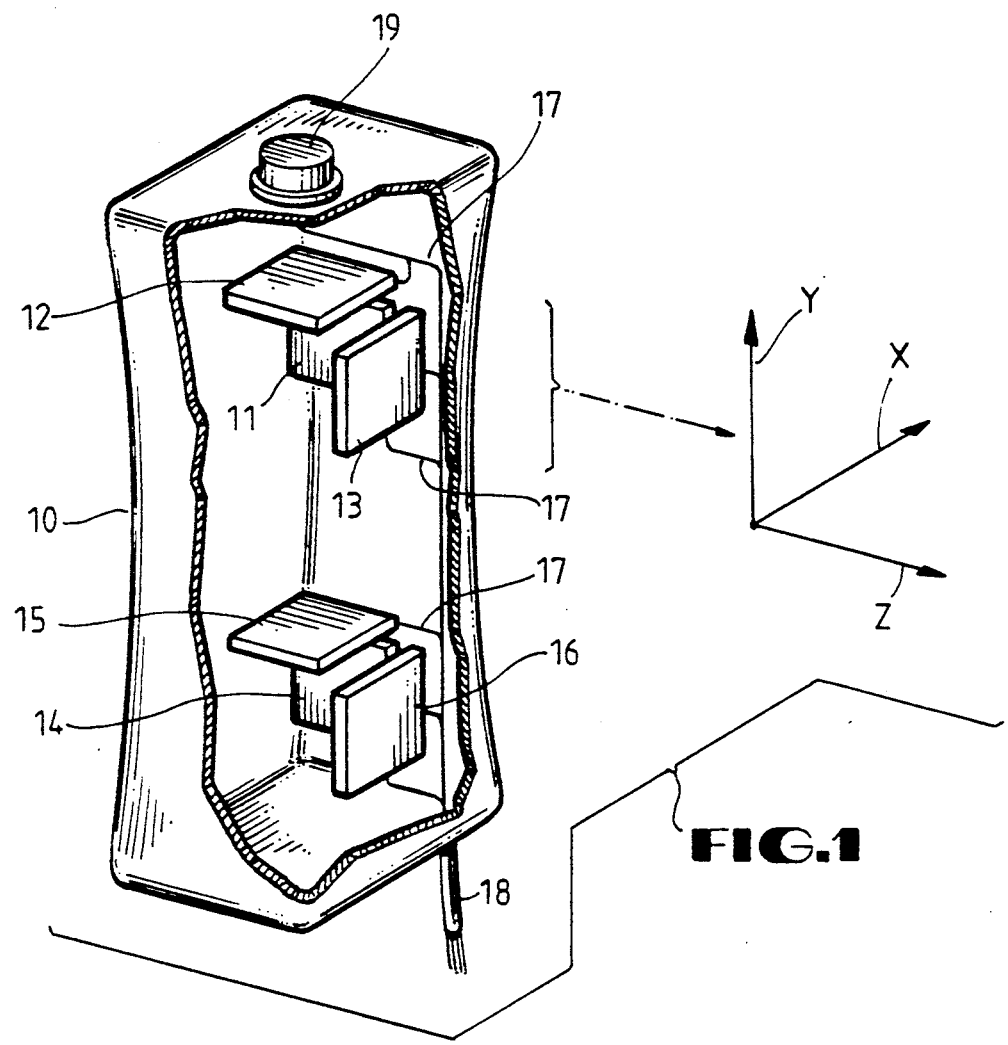
FIG.1
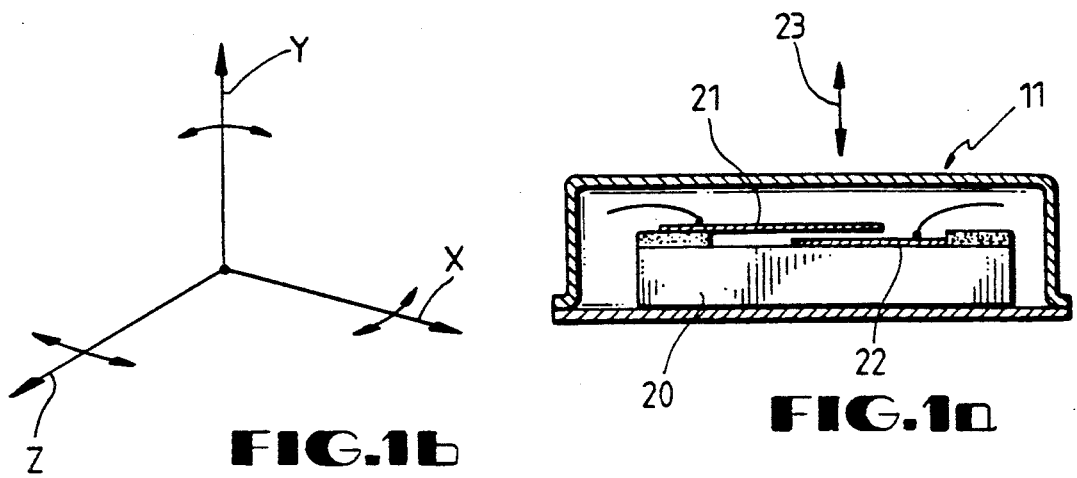
FIG.1b
FIG.1a

CONTROL DEVICE HAVING MULTIPLE DEGREES OF FREEDOM

BACKGROUND OF THE INVENTION

1. Field of the invention.

This invention relates to a control device and more particularly to a hand-held control device detecting multiple degrees of freedom of movement.

2. Related art.

In the past joysticks of various kinds have been used. They generally comprise a lever with a handle at one end. The other end of the lever is attached to linkages, potentiometers, tensiometers or accelerometers. Movement of the handle is transferred to a mechanical object to be moved, or generates electrical signals which stimulate an electrical object, or is converted to another form of energy to control some other medium.

Accelerometers have been commonly used in the past for such functions as guidance control of missiles. Early accelerometers were of an electro-mechanical nature and were usually bulky and complicated. With the introduction of electrostatic accelerometers their size and complexity have been reduced.

With today's micro mechanical and micro electronics manufacturing techniques, manufacturers are producing accelerometers of various kinds in small packages some of which incorporate electronic signal processing. The present invention uses such miniature accelerometers in a hand-held joystick able to detect at least six degrees of freedom of movement.

SUMMARY OF THE INVENTION

The present invention is directed toward a compact control system which employs accelerometers for detecting motion in a hand-held control device or joystick. The accelerometers are preferably arranged in two groups of mutually perpendicular arrays. A flexible cable connects the joystick to a signal processor. Electrical conductors transport the accelerometers' output data to the signal processor which processes the data and controls an output device.

The output device, such as a graphics display on a CRT, or an aircraft, has various parameters controlled by the motion of the joystick. Typically, a three dimensional graphics display will replicate on the screen the movement of the joystick. Similarly, the flight path of the aircraft will change in response to the movement of the joystick.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 1 is a pictorial view, partly broken away, of a hand-held joystick using six accelerometers according to one embodiment of the invention;

FIG. 1a is an elevation view in section of a typical accelerometer as used in the device of FIG. 1;

FIG. 1b is a pictorial view of the axes of the accelerometers of FIG. 1 showing the six degrees of freedom;

DETAILED DESCRIPTION OF SPECIFIC EMBODIMENTS

Figure 3:
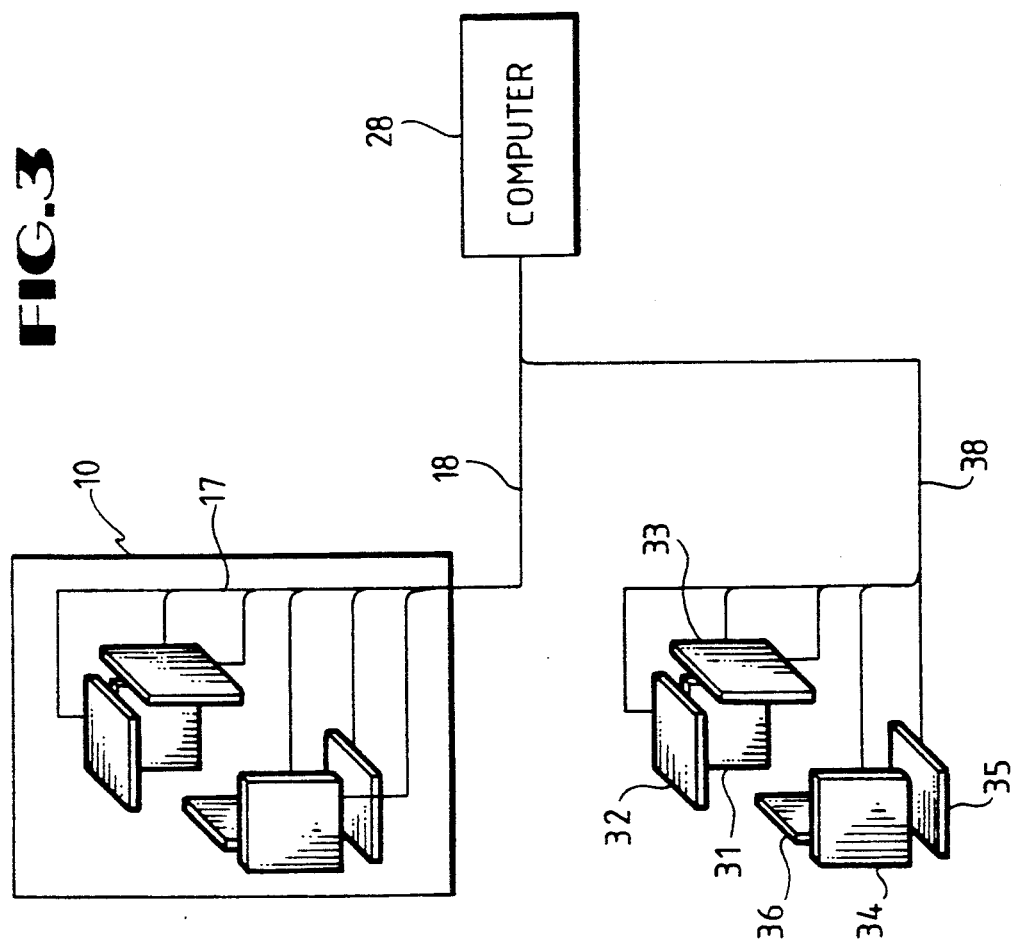
FIG. 3 is an electrical diagram in block form of an array of six accelerometers supported in a hand-held device and a second array of six accelerometers rigidly attached to a movable vehicle controlled by the hand-held device.

Referring to FIG. 1, according to one embodiment of the invention, a free-standing hand-held enclosure 10 rigidly supports two sets of three mutually-perpendicular accelerometers 11, 12 and 13, and 14, 15 and 16. The enclosure 10 is "free-standing" in that it is not mounted to swivel about some fixed anchor point or the like, but instead is held by the user as a pistol-grip type of hand-held device, free from any mechanical connection to a supporting structure. Each one of these accelerometers 11–16 is responsive to acceleration along a single axis, and each one generates an electrical signal indicating linear acceleration of this accelromter along this particular single axis. Separate connections 17 lead from the six accelerometers into a flexible cable 18. The hand-held enclosure may also support one or more manually-operated push button switches 19, and separate connections lead from the push button switch or switches into the flexible cable 18. These connections 17 may be electrical wires, or may be fibre optic connections for signals from the accelerometers and wires for supply voltages going to the accelerometers, for example.

Referring to FIG. 1a, each one of the accelerometers 11–16 may be in the form of a miniature substrate 20 having a flexible cantilevered member 21, and some means for measuring deflection of the cantilever 21. For example, strain gages may be used for this purpose, in which case the change of resistance of conductive paths on the cantilever is electrically detected. Or, the cantilever can create a variable capacitance between the tip of the member 21 and an underlying conductive pad 22; as the member 21 flexes due to acceleration along the axis 23 the capacitance changes and this change can be measured by a capacitance bridge or the like, thus producing an electrical signal in response to acceleration. In either case, the device will not respond to acceleration along either axis perpendicular to the axis 23 because the member 21 will not flex and the resistance or capacitance will not change. The device of FIG. 1a is made by metal deposition and photolithographic masking and etching techniques as used in manufacture of semiconductor integrated circuit devices. Of course, the device shown in FIG. 1a is merely illustrative, and the accelerometers 11–16 may be of other suitable construction.

The hand-held enclosure 10 supports the accelerometers 11–16 in two groups of three mutually perpendicular, spaced-apart arrays, i.e., accelerometers 11, 12 and 13 are one array and accelerometers 14, 15 and 16 the other array. With this geometric configuration any combination of translations and rotations is uniquely identified. The three degrees of translational motion refer to linear motion along three mutually perpendicular axes X, Y and Z, as illustrated in FIG. 1b; the X axis is commonly known as backwards and forwards, the Y axis as up and down, and the Z axis refers to left side and right side displacement. The three degrees of rotational motion refer to rotation about these same three mutually perpendicular X, Y and Z axes, and are commonly referred to as roll (X axis), yaw (Y axis) and pitch (Z axis). If the housing 10 is moved linearly in the X direction by the user, then the accelerometers 11 and 14 produce equal signals of the same sign, and all the other accelerometers produce no signal. Likewise, linear vertical motion causes the accelerometers 12 and 15 responsive to Y axis acceleration to generate signals, or Z axis motion causes accelerometers 13 and 16 to generate equal signals of the same sign. Rotation about one of the axes, on the other hand, causes the pairs of accelerometers to generate unequal signals, and, depending upon the center of rotation, the signals may be of opposite sign. For example, if rotation about the Z axis is initiated, the accelerometers 11 and 14 generate unequal signals, and the accelerometers 12 and 15 also generate signals due to the centrifugal forces; the signals from accelerometers 12 and 15 will continue even after the rotational motion reaches a constant speed, while the signals from the accelerometers 11 and 14 will fall to zero, then if the motion is stopped the signals from accelerometers 11 and 14 return as negative signals. These sets of signals will uniquely define a particular type of manual input (i.e., motion) applied by the user to the housing 10.

Figure 2:
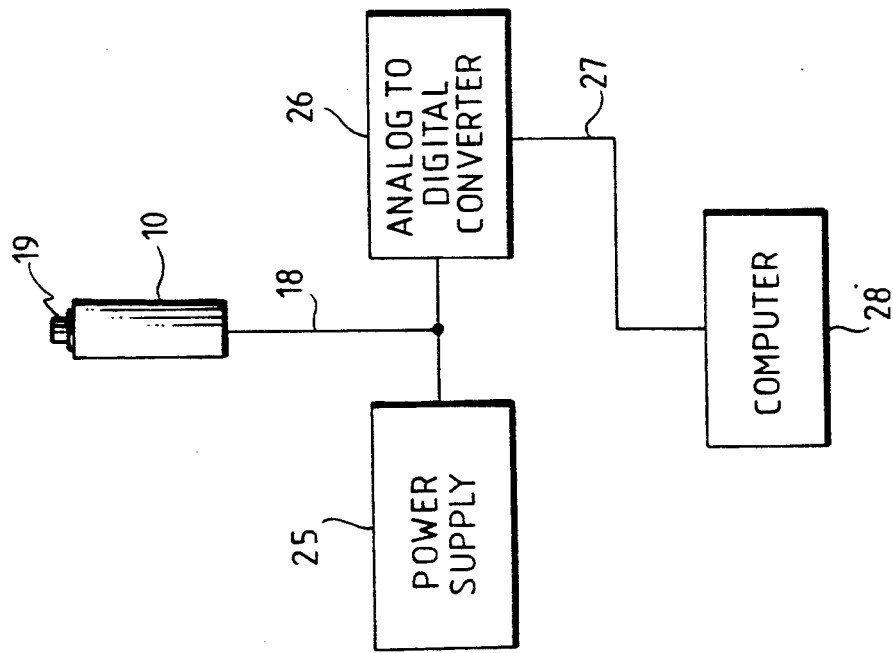
FIG. 2 is an electrical diagram in block form of a hand-held joystick connected to a power supply, a signal conditioner such as an analog-to-digital converter, and device under the control of the hand-held device.

Referring to FIG. 2, the flexible cable 18 electrically connects the hand-held enclosure to a power supply 25 which may contain signal generators for the capacitance bridges or whatever mechanism is used to detect the acceleration of the accelerometers 11-16, and this signal would be coupled to the enclosure 10. Alternatively, the power supply 25 may be in the form of a battery and circuitry within the housing 10. Signal conditioning circuitry 26 may be connected to receive the signals on the lines 17 from the accelerometers 11-16; this circuitry may include preamplifiers and analog-to-digital converters. A cable 27 electrically connects the outputs of the signal conditioner circuitry to a processor such as a computer 28 used to evaluate the six separate outputs from the accelerometers and to produce a resultant unique composite output as discussed above.

As the operator moves the hand-held device or joystick 10 each one of the accelerometers 11-16 generates a separate signal responsive to the acceleration described by the joystick resulting from this motion. The signals are transmitted through the flexible cable 18 into the conditioning circuitry 26 such as analog-to-digital (A/D) converter. An A/D converter changes the analog signals generated by the accelerometers into digital data. The digital data reaches the computer 28 via the connecting cable 27 as six separate digital representations of accelerations. The computer may be programmed to translate the data received from the joystick into control output data which controls an output device or manipulates other data already within the computer.

The flexible cable 18 is described as flexible to emphasize that it interferes as little as possible with the freedom of movement of the joystick or housing 10. Instead of an electrical wire cable a fibre optic cable may be used. Alternatively, the cable 18 may be omitted altogether and a wireless RF transmitter may be employed, transmitting the signals generated by the accelerometers 11-16 to a receiver in the computer 28. In this case the joystick 10 supports a power source, such as a battery, to supply power to the accelerometers 11-16 and to the transmitter.

Accelerometers with appropriate integrated signal processing may be used to eliminate the need of the A/D converter. In this case the flexible cable 18 will connect directly into the computer. In some applications the on/off switch may be omitted whilst in others more control switches such as a trigger-finger operated switch, or thumb-operated microswitches as used on "mouse" type computer input devices, may be added.

In one embodiment of the invention the hand-held joystick replaces the joystick, pedals, throttle assembly, trim controls and other input devices on an aircraft such as a helicopter. The computer output drives the servos which operate the aircraft's control surfaces. This embodiment reduces the pilot's workload, reduces the weight and cost of the vehicle and improves reliability due to a reduction of the number of components. In another application the hand-held joystick may be used in place of a mouse, joystick, and various switches or light pens in a three dimensional computer aided design or CAD system. In other applications the hand-held joystick simplifies the manipulation of three dimensional arrays of data, such as spread sheets or pages of a document in a word processor. The hand-held joystick may be used in computer games, the control output data controlling the video display. In another application the hand-held joystick may be used to control robots. Alternatively, the joystick may be coupled to other parts of the body, such as the head, instead of being operated by the hand, thus enabling a quadriplegic to operate a vehicle by moving his head, for example.

FIG. 3 illustrates an alternative embodiment of the invention where positive feedback or noise may be a problem, such as in an aircraft. The hand-held enclosure 10 supports the six accelerometers 11-16 as illustrated in FIG. 1. The cable 18 carries the leads from the accelerometers electrically connecting the accelerometers to the computer 28, as before. A second group of six accelerometers 31, 32, 33, 34, 35 and 36 is provided; these accelerometers are rigidly attached to the airframe of the aircraft in two groups of three mutually perpendicular arrays. A cable 38 carries the electrical connections of each accelerometer of the second group to the computer 28.

The second group of accelerometers 31-36 monitor the motion (acceleration) of the aircraft. Since a pilot holding the hand-held enclosure 10 is following the motion of the aircraft the accelerometers supported by the hand-held enclosure also monitor the motion of the aircraft. By receiving signals from both groups of accelerometers 11-16 and 31-36 the computer differentiates the motion of the pilot's hand relative to the motion of the aircraft. Generally, the acceleration of the group 31-36 is subtracted from that of the accelerometers 11-16, producing a net acceleration which represents the input added by the pilot. The computer 28 may use various algorithms to account for the inertia and damping of the pilot's arm, if desired.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. A control device responsive to linear movement along three mutually perpendicular axes and to rotation about said three axes, comprising:
   a hand-held enclosure; wherein said enclosure is manually movable with respect to a movable vehicle;
   at least two spaced-apart sets of multiple, mutually-perpendicular accelerometers mounted in said enclosure, each one of said accelerometers generating an electrical signal representative of acceleration of the device along one of said axes;
   in combination with a second control device containing at least two sets of multiple accelerometers fixedly mounted in said movable vehicle, said accelerometers of said second control device in each set being mutually perpendicular and producing electrical signals responsive to acceleration of said vehicle,
   and means for combining the electrical signals from said control device and said second control device to produce an indication of acceleration of said hand-held housing with respect to said movable vehicle.

2. A device according to claim 1 in combination with a control system located remotely from said enclosure, and means for coupling said electrical signals from said enclosure to said control system.

3. A device according to claim 2 wherein said means for coupling includes an RF link.

4. A device according to claim 2 wherein said means for coupling includes a wire cable extending from said enclosure to said control system.

5. A device according to claim 1 wherein each of said two sets of accelerometers includes three accelerometers.

6. A device according to claim 1 wherein said vehicle is an aircraft and said enclosure is a joystick operated by the pilot of the aircraft.

7. A method of generating control signals responsive to mechanical motion of a non-mechanically-supported, hand-held control element with respect to a movable reference, comprising the steps of:
   detecting linear acceleration and rotation of said control element with respect to three mutually perpendicular axes by two spaced-apart sets of three separate linear accelerometers to produce six electrical signals responsive to acceleration;
   detecting linear acceleration and rotation of said reference with respect to three mutually perpendicular axes by another pair of spaced-apart sets of three separate linear accelerometers to produce six reference signals responsive to acceleration; and
   combining said six electrical signals and six reference signals to produce said control signals.

8. A method according to claim 7 including the step of coupling said electrical signals from said control element to a control system located remotely from said element.

9. A method according to claim 8 wherein said step of coupling includes transmitting by an RF link.

10. A method according to claim 8 wherein said step of coupling includes transmitting on a wire cable extending from said element to said control system.

11. A method according to claim 7 wherein said two sets of accelerometers are physically spaced from one another.

12. A method of generating control signals responsive to mechanical motion of a non-mechanically-supported, hand-held control element within a movable vehicle, comprising the steps of:
   detecting acceleration of said control element along three mutually perpendicular axes by a first pair of spaced-apart sets of three separate linear accelerometers to produce six electrical signals responsive to acceleration;
   detecting acceleration of a reference element along three mutually perpendicular axes by a second pair of spaced-apart sets of three separate accelerometers to produce six reference signals responsive to acceleration, said reference element being fixedly mounted in said movable vehicle;
   and combining said six electrical signals and said six reference signals to produce said control signals.

13. A method according to claim 12 including the step of coupling said electrical signals from said control element to a control system located remotely from said element.

14. A method according to claim 13 wherein said step of coupling includes transmitting by an RF link.

15. A method according to claim 13 wherein said step of coupling includes transmitting on a wire cable extending from said element to said control system.

16. A method according to claim 12 wherein each of said first and second pairs of spaced-apart sets of three separate accelerometers are physically spaced from one another.

17. A control device responsive to linear movement along a plurality of mutually perpendicular axes with respect to a movable reference position, comprising:
   a hand-held enclosure movable with respect to said reference position;
   at least two spaced-apart mutually-perpendicular first accelerometers mounted in said enclosure, each one of said first accelerometers generating an electrical signal representative of the acceleration of the device along one of said axes;
   at least two spaced-apart mutually-perpendicular second accelerometers mounted at said reference position, each one of said second accelerometers generating an electrical signal representative of the acceleration of the reference position along one of said axes;
   and means responsive to said electrical signals from said first and second accelerometers to generate an indication of movement of said enclosure relative to said reference position.

18. A device according to claim 17 including two sets of said mutually-perpendicular first accelerometers, each set having three said accelerometers, said device being responsive to rotation about said three axes.

19. A device according to claim 17 in combination with a control system located remotely from said enclosure, and means for coupling said electrical signals from said enclosure to said control system.

20. A device according to claim 19 wherein said means for coupling includes an RF link.

* * * * *